C. A. HALL.
TREATMENT OF CEMENT COPPER.
APPLICATION FILED JAN. 8, 1917. RENEWED SEPT. 10, 1918.

1,290,024.                                                  Patented Dec. 31, 1918.

UNITED STATES PATENT OFFICE.

CLARENCE A. HALL, OF PHILADELPHIA, PENNSYLVANIA, ASSIGNOR TO PENNSYLVANIA SALT MANUFACTURING COMPANY, OF PHILADELPHIA, PENNSYLVANIA, A CORPORATION OF PENNSYLVANIA.

TREATMENT OF CEMENT COPPER.

1,290,024.  Specification of Letters Patent.  Patented Dec. 31, 1918.

Application filed January 8, 1917, Serial No. 141,103. Renewed September 10, 1918. Serial No. 253,464.

*To all whom it may concern:*

Be it known that I, CLARENCE A. HALL, a citizen of the United States, residing at Philadelphia, in the county of Philadelphia and State of Pennsylvania, have invented certain new and useful Improvements in the Treatment of Cement Copper, of which the following is a specification.

Cement copper in association with waste liquor is a product formed by the treatment of cinders from the roasting or cupreous pyrites in the manufacture of sulfuric acid and it usually contains not less than 25% of moisture which is provided to prevent spontaneous heating in the air and to make transportation safe. In this condition it is necessary to matte and smelt the mass in the operation of recovering the copper value.

The principal objects of the present invention are, first, to dispense with the cost of matting and smelting, second, to put the cement copper in such condition that it does not tend to heat and is dry and capable of transportation and treatment for the recovery of the copper value by a melting operation, and third, to provide for doing this at less cost than the cost of matting, smelting and incidentally driving off moisture.

In accordance with the present invention cement copper and waste liquor constituents are pressed into brick or like form and dried as is hereinafter more fully described and finally claimed.

The drawings illustrate diagrammatically one form of apparatus by means of which the invention can be practised, and in them—

The invention will be described in connection with the accompanying drawings, and it will be assumed that use is made of cement copper and waste liquor containing approximately 25% of moisture, but it must be understood that the invention is not limited as to those matters and that different apparatus may be used and that the cement copper may contain more or less moisture. However, in this description reference will be made to the treatment of cement copper containing approximately 25% of moisture, because that is the amount of moisture generally present under usual practice and reference will be made to the use of a kiln or drier, although in some cases air drying may be used.

Figure 1:
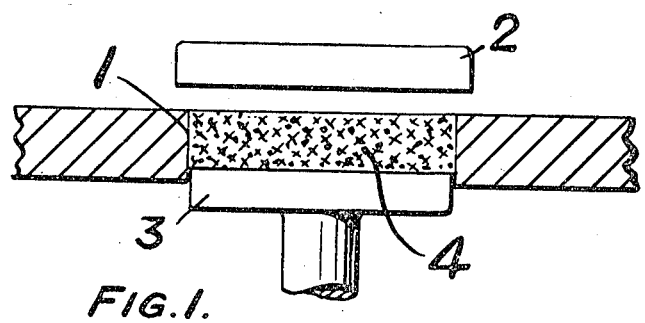
Figure 1, is a view, principally in section, of a press.

Cement copper and waste liquor containing about 25% of moisture, having been selected merely for the sake of description, is pressed into bricks or other forms. For this purpose use may be made of a hand brick-press diagrammatically shown in Fig. 1, in which 1, is a mold, and 2 and 3, pressers between which the cement copper 4, is pressed and molded. One result of pressing the cement copper into brick or like form is to eliminate a considerable percentage of water which carries with it impurities, so that the finished bricks, after drying, contain a relatively high copper content. The pressed brick in order to be coherent after drying, should contain waste liquor constituents which seem to act after the manner of a binder. With this in mind the pressure should be applied, for if the pressure is too high the dried bricks will be too friable. A hand brick press exerts about 250 pounds to the square-inch and while this is appropriate for cement copper containing about 25% of moisture, the invention is obviously not limited in that regard, for it is possible to extract at one operation from the cement copper all of the moisture in excess of that required to furnish enough waste liquor binding constituents.

Figure 2:
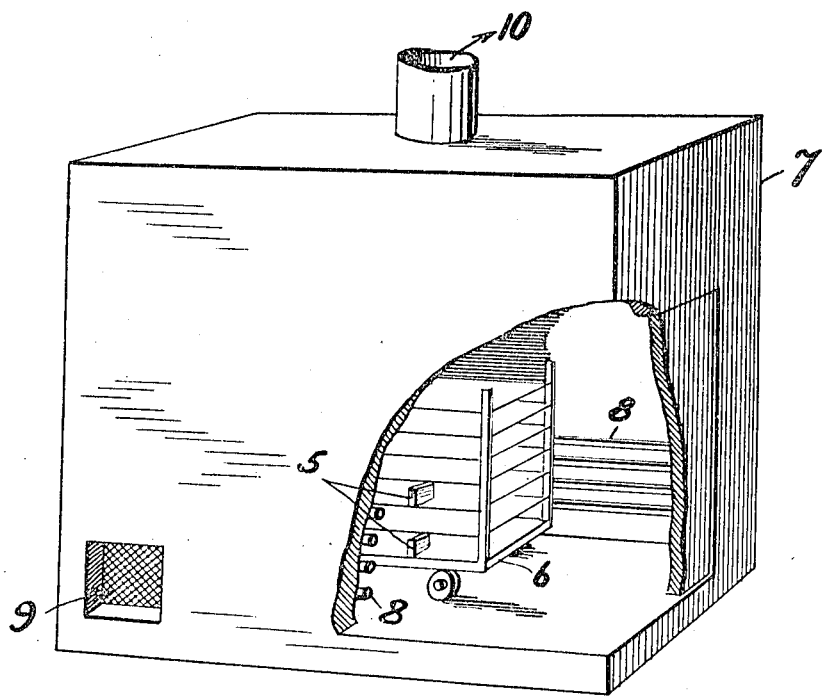
Fig. 2, is a perspective view, with parts broken away, of a kiln or drier.

The pressed bricks are dried, and the heat which they develop assists in the operation. Circulating air and the further application of heat also assist. For this purpose the pressed bricks 5, may be loaded edgewise on suitable cars 6, which are run into a drying room or kiln 7, Fig. 2, where a constant circulation of air passing over steam pipes 8, is kept up. 9 and 10, are openings which may be used for the inlet of air and the outlet of air and moisture, and if desired, suitable fans can be supplied. In twenty-four hours, more or less, the bricks are dry. The heat given off by the bricks may be sufficient for a time, but it is well to supplement it with heat from some other source.

Bricks made as described may contain even less than 1% of moisture, but if more moisture is tolerated and time is not of importance, the bricks can be air-dried without the application of extraneous heat.

The finished bricks are hard, like building bricks, dry, coherent and non-heating, and consist of relatively pure cement copper with enough waste liquor constituents to act as a binder. These bricks can be transported safely, and even exposed to the weather, and in treating them for the recovery of their copper content the operation is a melting one, in which matting and smelting are not required. The point is that the bricks melt although they are not of pure copper.

What I claim is:

1. Coherent dry non-heating bricks of cement copper and waste liquor constituents.

2. Coherent dry non-heating bricks of cement copper and waste liquor constituents and containing less than one per cent. of moisture.

3. The process of treating cement copper which consists in pressing it into brick form in the presence of waste liquor to expel moisture and retain waste liquor constituents for binding purposes, and drying the bricks to render them non-heating, substantially as described.

4. The process of treating cement copper containing about 25% of moisture, which consists in pressing it into brick form under about 250 pounds pressure to the square-inch, and then drying the bricks, substantially as described.

5. The process of treating cement copper which consists in pressing it into brick form in the presence of waste liquor to expel moisture and retain waste liquor constituents for binding purposes, and drying the bricks in a circulation of air partly by heat developed by their oxidation and partly by applied heat, substantially as described.

6. The process of treating cement copper which consists in pressing it into brick form, drying the bricks, and melting the bricks to recover the copper value, substantially as described.

CLARENCE A. HALL.

Copies of this patent may be obtained for five cents each, by addressing the "Commissioner of Patents, Washington, D. C."